United States Patent [19]

Beckham

[11] 4,247,335
[45] Jan. 27, 1981

[54] ASPHALT COMPOSITION RESISTANT TO WEATHERING

[75] Inventor: Rodney D. Beckham, Bridgeton, Mo.
[73] Assignee: Monsanto Company, St. Louis, Mo.
[21] Appl. No.: 733,965
[22] Filed: Oct. 19, 1976
[51] Int. Cl.³ .............................................. C08L 95/00
[52] U.S. Cl. .............................. 106/273 R; 106/278; 106/279; 260/28.5 AS
[58] Field of Search .................. 106/273, 279; 208/22, 208/23, 40, 44; 260/28 (U.S. only), 28.5, 62

[56] References Cited

U.S. PATENT DOCUMENTS

| | | | |
|---|---|---|---|
| 2,906,720 | 9/1959 | Simpson | 260/28 |
| 2,923,745 | 2/1960 | Buls et al. | 260/624 C |
| 2,965,612 | 12/1960 | Holland et al. | 260/62 |
| 3,207,687 | 9/1965 | Maier | 208/44 |

*Primary Examiner*—Theodore Morris
*Attorney, Agent, or Firm*—James C. Bolding

[57] ABSTRACT

Paving-grade asphalt compositions having improved resistance to weathering are described which are obtained by incorporating into a paving-grade asphalt either (1) the product obtained by alkylating phenol with a resin oil, i.e., a hydrocarbon fraction of medium molecular weight compounds in the $C_9$ carbon range primarily aromatic in nature, or (2) the condensation product of formaldehyde with the alkylation product of phenol and a $C_4$ raffinate stream consisting mainly of butene-1, butene-2 and isobutylene.

4 Claims, 6 Drawing Figures

ASPHALT COMPOSITION RESISTANT TO WEATHERING

BACKGROUND OF THE INVENTION

The present invention relates to improved asphalt compositions. More particularly, it relates to asphalt compositions useful in road building or paving having improved resistance to weathering.

Asphalt has become widely used as binder for aggregate materials particularly for the preparation of pavements and roads. Asphalt is of organic composition and is subject to change and/or degradation as a result of the normal weathering process. Solar radiation, oxidation and water effects all combine to cause chemical and physical changes which render asphalt a less functional mastic for mineral aggregates employed in road or pavement construction. Weathering caused by solar radiation and oxidation is referred to as "age hardening" while the detrimental effects due to water exposure are referred to as "water stripping."

Commercial products are available to combat both types of weathering. Water-stripping inhibitors and inexpensive long lasting anti-oxidants have not, however, been combined in a suitable fashion in asphaltic paving compositions. It appears that both are needed in many cases to achieve increased road life to any significant degree based on the probability that the mechanism of road degradation shifts from one form of deterioration to the other depending upon which type additive is missing. It is, accordingly, an object of the present invention to provide an asphalt composition having improved properties for use in paving and construction of roads.

It is another object of the invention to provide paving-type asphalt compositions having increased resistance to age-hardening. Still another object of the invention is to provide paving-type asphalt compositions which will not be stripped from mineral aggregates by water after the road and/or pavement is constructed. Other objects and advantages of the invention will become apparent from the following description thereof and the examples given below.

SUMMARY OF THE INVENTION

In accordance with the present invention, paving-grade asphalt compositions having improved resistance to weathering are obtained by incorporating in such asphalt compositions an additive which is either (1) the product obtained by alkylating phenol with resin oil, hereinafter defined, or (2) the condensation product of formaldehyde with the alkylation product of phenol and a C-4 raffinate, also hereinafter defined. Evaluation of the asphalt compositions containing these additives established their superiority in dark oxidation tests and the compositions show less susceptibility to water stripping on quartz squares than does asphalt not containing the additives. In addition, the resin oil alkylate is compatible with a commercial anti-strip additive in paving-type asphalt and has no adverse effect on the effectiveness of the commercial anti-strip additive used for preventing water stripping of asphalt from quartz squares.

DESCRIPTION OF THE PREFERRED EMBODIMENTS

Figure 1:
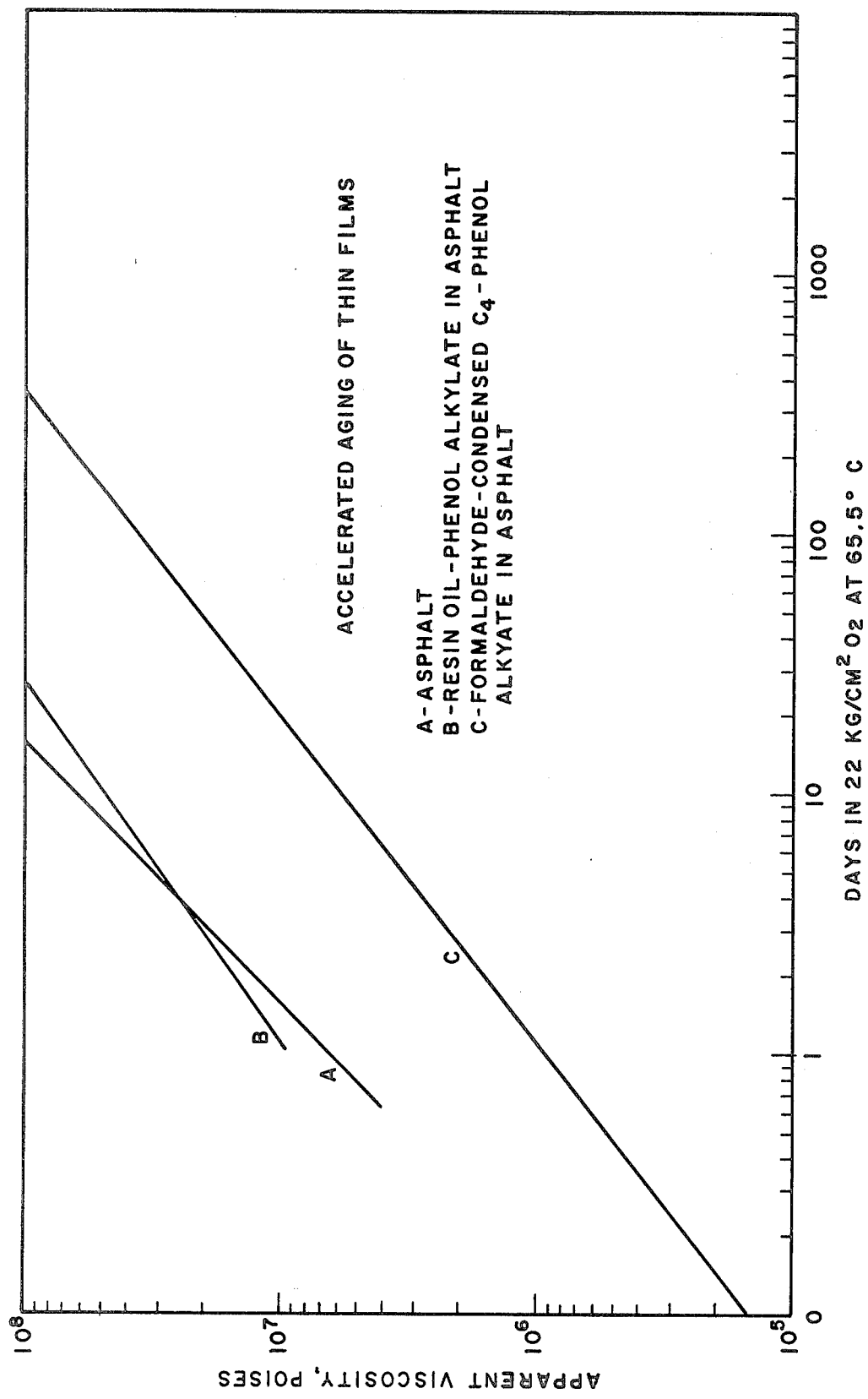

The additives to be incorporated in paving-grade asphalts according to the present invention to improve the weatherability of said asphalts are (1) those obtained by alkylating phenol with resin oil; and (2) the condensation product of formaldehyde with the alkylation product of phenol and a $C_4$ raffinate. The phenol alkylate is prepared by heating together at a temperature from about 70°–100° C., a mixture of resin oil and phenol containing an excess of the resin oil while they are in intimate contact with an acid catalyst such as sulfuric acid, for example. Mole ratios of resin oil (unsaturates) and phenol are such as to provide the dialkylated product, i.e., a mole ratio of at least 2:1, since the monoalkylate is of too low a molecular weight for use as an asphalt inhibitor, i.e., is not appropriately non-volatile. After reaction is complete, the mixture is neutralized with a solution of sodium bicarbonate and diluted with n-hexane for phase separation and filtration. Flash distillation of the diluted organic phase is effected at atmospheric pressure and a pot temperature of about 350° C. to remove unreacted components and diluent. The alkylated product is recovered as the pot residue. "Resin oil" as employed herein is defined as a hydrocarbon fraction of medium-molecular-weight compounds in the $C_9$ carbon range primarily aromatic in nature and highly reactive because of its high level of unsaturation to produce resinous products. Such a resin oil material is typically produced by thermal cracking of heavy petroleum feedstocks to produce ethylene, etc. A typical resin oil composition is presented below.

Naphthalene, 3–7 Wt. %
Vinyl Toluene, 15–17
Indene, 13–15
Methyl Indene, 6–7
$C_3$ Alkyl Styrene, 5–6
α-Methylstyrene, 2–3
β-Methylstyrene, 1–2
Divinylbenzene, 1–2
Styrene, 1–2
Dicyclopentadiene, 10–12
Methyl Dicyclopentadiene, 4–5
$C_3$ Alkylbenzene, 20–25
$C_4$ Alkylbenzene, 5–10
$C_2$ Alkylbenzene, <1.0

The dialkylated product from the resin oil-phenol reaction is sufficiently high in molecular weight to preclude the need for condensation with formaldehyde in order to achieve a low-vapor-pressure anti-oxidant.

The second additive for incorporation into asphalt according to the invention is prepared by first reacting phenol with a $C_4$ raffinate and then condensing the alkylation product with formaldehyde. $C_4$ raffinate is defined for the purposes of this invention as the fraction remaining after the separation of butadiene by extraction techniques from a so-called olefin plant mixed $C_4$ stream. The olefin plant to produce this material is typically a thermal cracker being fed butanes or higher paraffins under conditions appropriate to make ethylene. This $C_4$ raffinate stream consists mainly of butene-1, butene-2 and isobutylene. A typical composition of $C_4$ raffinate is as follows:

|  | Wt. % |
|---|---|
| Propylene | 0.40 |
| Iso-butane | 4.10 |
| Normal butane | 6.40 |
| 1-butene | 24.10 |
| Iso-butene | 49.30 |
| Trans 2-butene | 12.10 |
| Cis 2-butene | 3.50 |

-continued

| | Wt. % |
|---|---|
| 1,3-butadiene | 0.10 |

Alkylation of phenol with the $C_4$ raffinate is carried out in a manner similar to that described in U.S. Pat. No. 2,923,745. A mixture of the raffinate and phenol are heated together under pressure while in contact with an aluminum halide catalyst employing a reactant ratio greater than one mole of $C_4$ raffinate to one mole of phenol. The reactant ratio is by far the most critical variable. Two to five moles of $C_4$ raffinate to one mole of phenol give best results. The optimum ratio of mono- to dialkylate in the alkylation product is achieved using a $C_4$/phenol mole ratio of 3.8. Reaction temperature for the alkylation lies within the range from 100° to 200° C. and preferably is between 150° to 160° C. Pressure may vary from about 8 to 71 kg/cm$^2$ but pressures of the order of 15 to 64.3 kg/cm$^2$ are employed at the preferred temperatures. Although any of the aluminum halides can be used as catalysts, aluminum chloride is the most preferred because of its high relative activity, availability and low cost. The catalyst is preferably employed in small quantities. Amounts on the order of 0.001 to 0.20 mole of aluminum halide catalyst per mole of phenol are generally employed whereas with the preferred catalyst, aluminum chloride, the preferred concentration range is 0.005 to 0.10 mole per mole of phenol. Control of the reaction time is important so as to prevent side reactions such as isomerization, dealkylation or production of undesirable by-products. Reaction times of 20 minutes to 180 minutes are used under the preferred reaction conditions of catalyst concentration, heat, pressure and mixing. It is desirable to stop the reaction at the end of the reaction time by adding caustic or water to the reaction mixture. Unreacted components may then be readily distilled from the resulting mixture.

In order to increase its molecular weight, the $C_4$-phenol alkylate obtained as described above is condensed with formaldehyde in the manner and under the conditions well known in the art employing a mole ratio of formaldehyde to alkyl phenols of about 0.6:1 and an acid catalyst such as sulfuric acid.

The preparation of the additives to be incorporated in paving-grade asphalts is illustrated by the following examples.

EXAMPLE 1

Ninety-four (94) grams of melted phenol and 2.8 g of $H_2SO_4$ were placed into a 2000-ml., 3-necked flask equipped with a thermowell, stirrer, water condenser, heater and dropping funnel. The dropping funnel contained 290 g of resin oil having the typical composition given above which was introduced into the reaction flask maintained at a temperature from 90°–100° C. over a period of from 1½ to 2 hours reaction time. At the end of the reaction period, the reaction mixture was neutralized with 3.3 g $Na_2CO_3$ and then diluted with 400 cc of n-hexane. The resulting mixture was filtered and the diluted reaction mixture was flash-distilled to remove unreacted components and diluent hexane. The alkylated product was recovered as the pot residue (252 g).

EXAMPLE 2

A one-liter Parr autoclave equipped with stirrer, 142 kg/cm$^2$ rupture disc, 142 kg/cm$^2$ pressure gauge (stainless steel bourdon) and liquid and gas-sampling valves was employed for the reaction. One mole of phenol (94 g) and 0.1 mole $AlCl_3$ (13.4 g) were introduced into the reactor and it was sealed. The reactor was pressured to about 13.3 kg/cm$^2$ with helium and checked for leaks. After decompression, the bomb was placed into dry ice for introduction of 75.2 g of $C_4$ raffinate as hereinbefore defined.

After charging the $C_4$ raffinate, the autoclave was allowed to come to room temperature and then placed directly into a reactor heater maintained at 160° C. Reaction was carried out at 6.7 kg/cm$^2$ for 1.75 hours.

The autoclave was depressurized and the contents thereof flash distilled to obtain 136 g of alkyl phenols. Analysis of the product showed it to be 61% monoalkylate, 32% dialkylate and 7% heavies.

EXAMPLE 3

One hundred thirty grams (130 g) of the alkyl phenol product of Example 2 was admixed with 13.8 g (0.57 mole) of formaldehyde as trioxane and 5.0 cc of concentrated sulfuric acid and the mixture was introduced into a stirred, 3-necked flask equipped with reflux condenser, dropping funnel and thermowell. Formaldehyde as trioxane (13.8 g-0.57 mole) was dissolved in 100 ml of dichloroethane and introduced via the dropping funnel at a rate to maintain the reaction temperature at 100° C.

The reaction mixture was further diluted with dichloroethane and the $H_2SO_4$ was neutralized with CaO, care being taken in adding CaO to prevent conversion of the mix to a basic pH.

The neutralized mixture was filtered and the solvent was flash distilled from the filtrate to obtain a residue of 126 g of alkyl phenol-formaldehyde condensate having an ASTM ring and ball softening point of 195° C.

The asphalts or bituminous materials with which the additives of the present invention are employed to provide compositions with increased weatherability are those employed in the construction and repair of roads and are normally solid, semi-solid or viscous liquid materials at ordinary atmospheric temperatures. Such asphalts or bituminous materials are mixtures of hydrocarbons of natural or pyrogenous origin and are usually derived from petroleum or coal but may occur as such in nature. Petroleum asphalt produced by steam-refining, by air-blowing, by solvent-extraction methods or a combination of such methods and having penetration values of about 30 to about 400 according to ASTM Test D-5-25 is most advantageously used. A specific example of an asphalt of the paving-grade type is a normally solid petroleum-derived, propane-extracted material having a penetration of 85–100 at 77° F.

The additives may be incorporated in the asphalt by well known and convenient methods such as by stirring while the asphalt is heated and in a fluid state. Other additives such as anti-stripping agents may be incorporated along with the additives described herein. In fact, one of the advantages of the additives of the invention is their compatibility with commercially available anti-strip additives. The amount of additive employed may vary from 0.25 to 7 weight percent of the asphalt and preferably is in the range from about 0.5 to about 4% by weight.

The effectiveness of the herein-described additives in enchancing the resistance to age-hardening and adhesion of asphalts to moist mineral aggregates is demonstrated in the following examples.

ASTM Test D-259-62 is an accelerated weathering test for bituminous materials. Data from this test have been shown to correlate with actual field age hardening. The accelerated thin film aging processes described hereinafter in Examples 4 and 5 provide data which parallel data from the above-mentioned ASTM method for aging of various asphalts. However, converting to field life from accelerated data in the present case is less precise.

EXAMPLE 4

The additives in Examples 1 and 3 were evaluated for effectiveness in preventing accelerated dark oxidative hardening of a propane-extracted asphalt having a penetration of 85–100 at 77° F. A Carver 9072-kg press equipped with heated platens which had been milled flat to within 0.025 mm was used for preparation of thin asphalt films. The platens were maintained at 65° C. to assist in asphalt flow while molding the films. Backing and spacing sheets 7.6 cm × 10.2 cm in size were cut from cellophane 0.033 mm thick, the spacing sheet having a 5.1 cm × 7.6 cm center cut-out. A very small portion of the asphalt was transferred from the tip of a spatula to the center of the backing cellophane sheet. The spacing sheet was then placed over the backing sheet with the asphalt sample centered in the cut-out section of the spacing sheet. A third sheet of duPont FEP Teflon 0.025 mm thick was placed over the two cellophane sheets prior to molding. All three sheets were firmly held together and placed onto the lower molding face of the Carver press for film molding. For 15 seconds, 142 kg/cm$^2$ of hydraulic pressure was applied to the asphalt between the cellophane and Teflon films and was retained there by the 0.033 mm-cellophane spacer to provide a film fairly uniform in thickness. Measurement of the asphalt film thickness was made immediately upon removal of the film from the mold using a spring-loaded micrometer (0.001 divisions) and the sum of the Teflon and cellophane thickness was subtracted from the total micrometer reading to get the asphalt film thickness.

All thin asphalt films were aged at 65.5° C. under 22 kg/cm$^2$ of oxygen. Since the asphalt used will coalesce at 65.5° C. on Teflon destroying the film, the thin asphalt films for the aging tests were supported on cellophane. The asphalt film prepared as described above sandwiched between a film of cellophane and Teflon made it possible to pull away the Teflon film at room temperature with ease and leave a 0.033-mm film of asphalt supported on a 0.033-mm film of cellophane.

The films were positioned on a stainless steel rack with multiple shelving which was inserted into a 2-liter Parr bomb reactor cylinder (10.2 cm I.D. and 26.7 cm deep) equipped with sealing cap composed of pressure gauge, blow out disc (8 kg/cm$^2$) and valving for pressuring and decompression which served as a dark pressure oxidation chamber. Temperature was maintained by placing the entire bomb in an oven. Sampling was done periodically. All samples were analyzed for oxidative degradation by infrared technique for increases in the C=O frequency (1700 cm$^{-1}$) and for viscosity increases by using a sliding plate microviscometer (Hallikainen Instruments Model 113-A), Therminol bath control (Model 1053A) and Varian G-10 recorder wherein chart movement of a recorder pen is calibrated to correspond to movement of one plate with respect to the other caused by the force applied. For the latter measurements, the asphalt films were transferred to a set of two glass plates so that the film was held between the two plates. Each set of glass plates was evaluated in the sliding microviscometer under several loads (100, 200, 300, etc., g). Viscosity was calculated as follows:

$$\text{Viscosity (Poises)} = \frac{\text{Load in g} \times 980}{\text{Area of plates in cm}^2} \cdot \frac{\left(\begin{array}{c}\text{Chart recorder}\\\text{movement-Units}\end{array}\right)\left(\begin{array}{c}\text{cm per chart}\\\text{division}\end{array}\right)\left(\begin{array}{c}\text{Chart speed in}\\\text{inches/second}\end{array}\right)}{\left(\begin{array}{c}\text{Chart movement}\\\text{in inches}\end{array}\right)\left(\begin{array}{c}\text{Film thickness}\\\text{in microns}\end{array}\right)\left(10^{-4}\right)}$$

Shear rate was plotted against viscosity in poises for each load stress. The plot was a linear function on log-log paper and easily extrapolated to a $10^{-4 cm-1}$ shear rate for comparison of all samples. The extrapolated value was then referred to as the "apparent viscosity." FIG. 1 depicts the change in apparent viscosity with time for asphalt compositions containing the resin oil-phenol alkylate and the formaldehyde-condensed C$_4$-phenol alkylate of the invention, and for the asphalt control (i.e., no additive).

Figure 2:
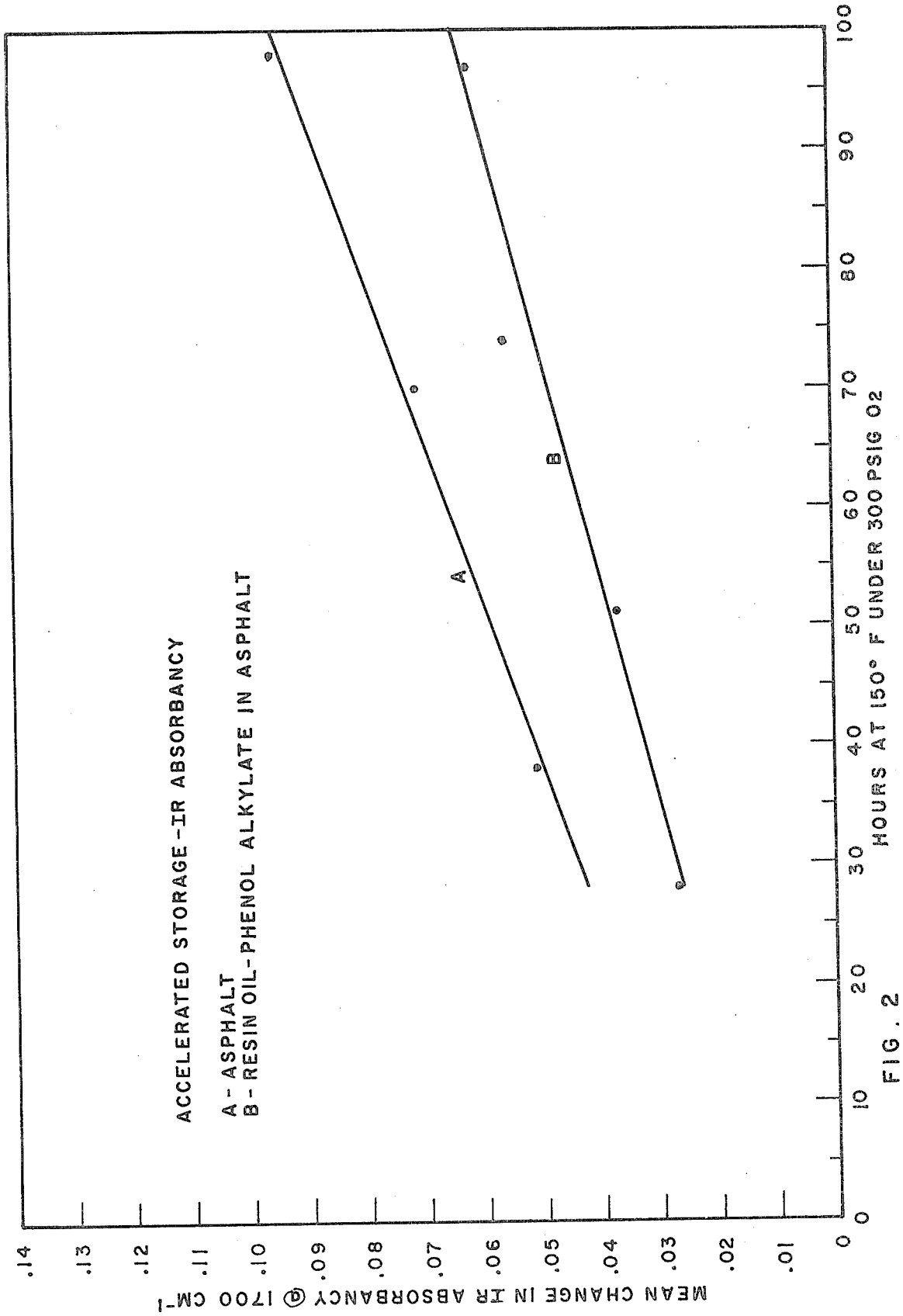

Excess asphalt squeezed from between the two glass plates during preparation of the samples for viscosity determinations was used for infrared analysis. The asphalt films were prepared as described above for the aging tests except that the cut-out area in the spacer was reduced to 2.5 cm × 2.5 cm approximately and the asphalt film was supported on the Teflon film instead of cellophane. This was accomplished by immersing the asphalt film sandwiched between cellophane and Teflon in water for one or two minutes. The cellophane absorbs water and its bond to asphalt becomes weaker than that of Teflon so the wet cellophane can be easily removed leaving the asphalt film on Teflon. After drying, the Teflon and asphalt film were mounted on heavy manila paper having a window cut out to provide support for handling and analysis purposes, the window providing for the IR beam passage through both films. The Teflon film was free of absorbance at 1700 $cm^{-1}$ so that measurement of this value was unobstructed. Four IR scans were made on each asphalt film because changes of C=O frequency with age are of such small magnitude. The absorbancies were averaged to get a statistically meaningful result. Mean changes in absorbency are plotted against accelerated storage time in FIG. 2 for asphalt containing resin oil-phenol alkylate and for the control sample containing no additive.

Figure 3:
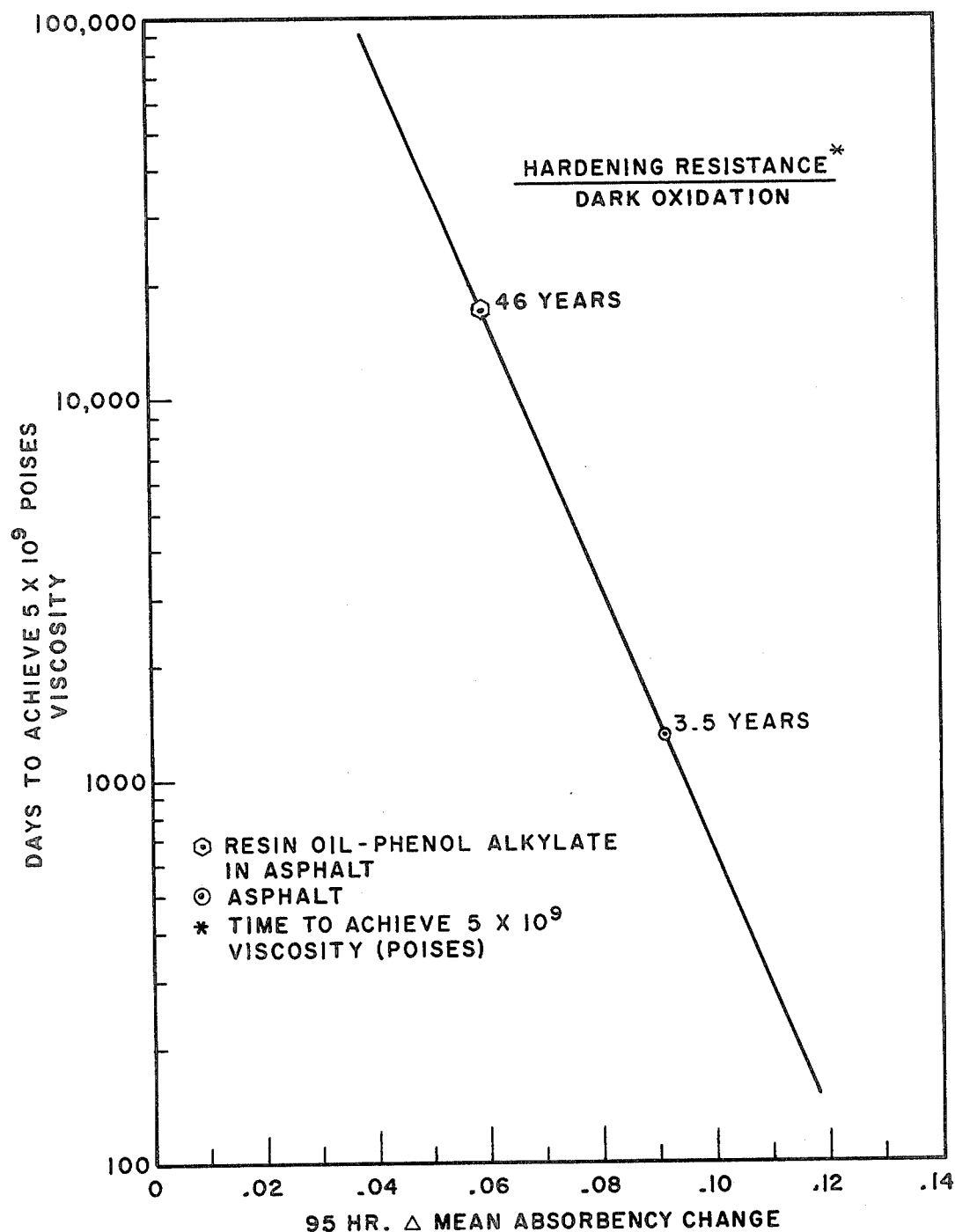

FIG. 3 is a plot of age (log) at $5 \times 10^9$ poises and a common infrared absorbency point and shows the days necessary for the dark oxidation procedure to increase asphalt viscosity to $5 \times 10^9$ poises, a viscosity which represents a theoretical fracture point for asphalt under any rate of strain. Age at $5 \times 10^9$ poises was obtained by extrapolating data in FIG. 1. According to this graph, 85–100 penetration asphalt has a life expectancy of 3.5 years. The same asphalt with 2% resin oil-phenol alkylate has an expected life of 46 years, a 13-fold increase over that with no additive.

EXAMPLE 5

Figure 4:
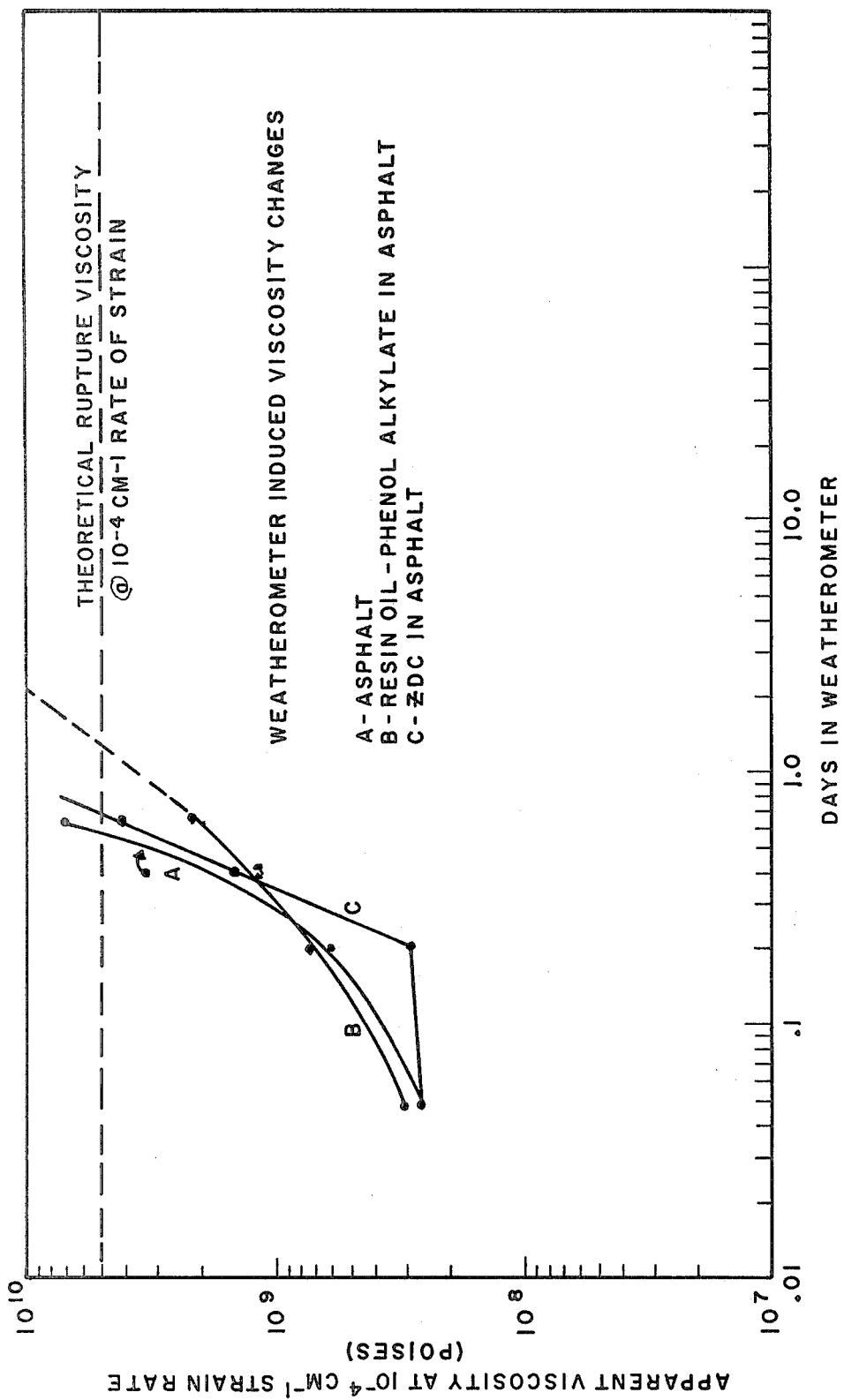
Figure 5:
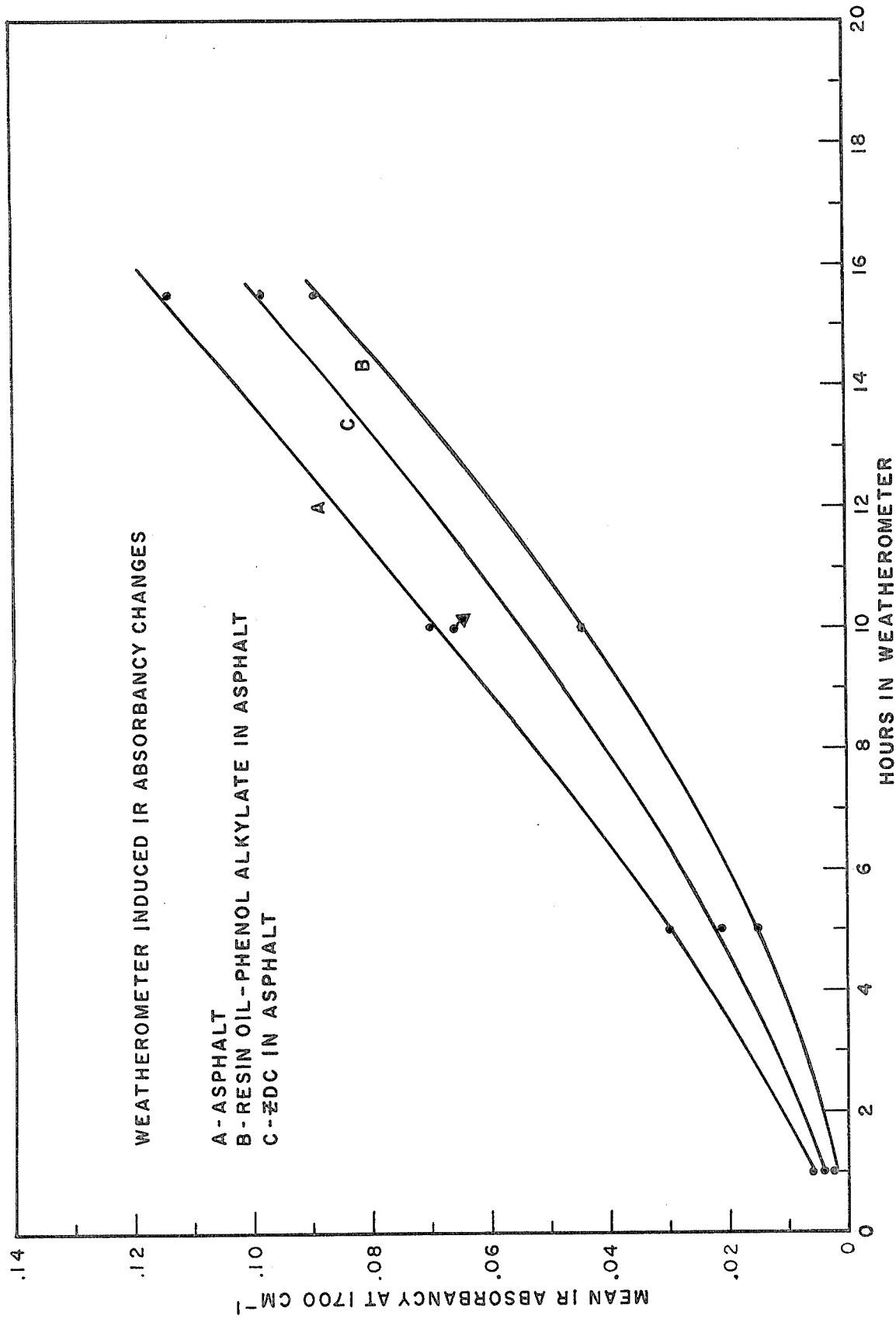
Figure 6:
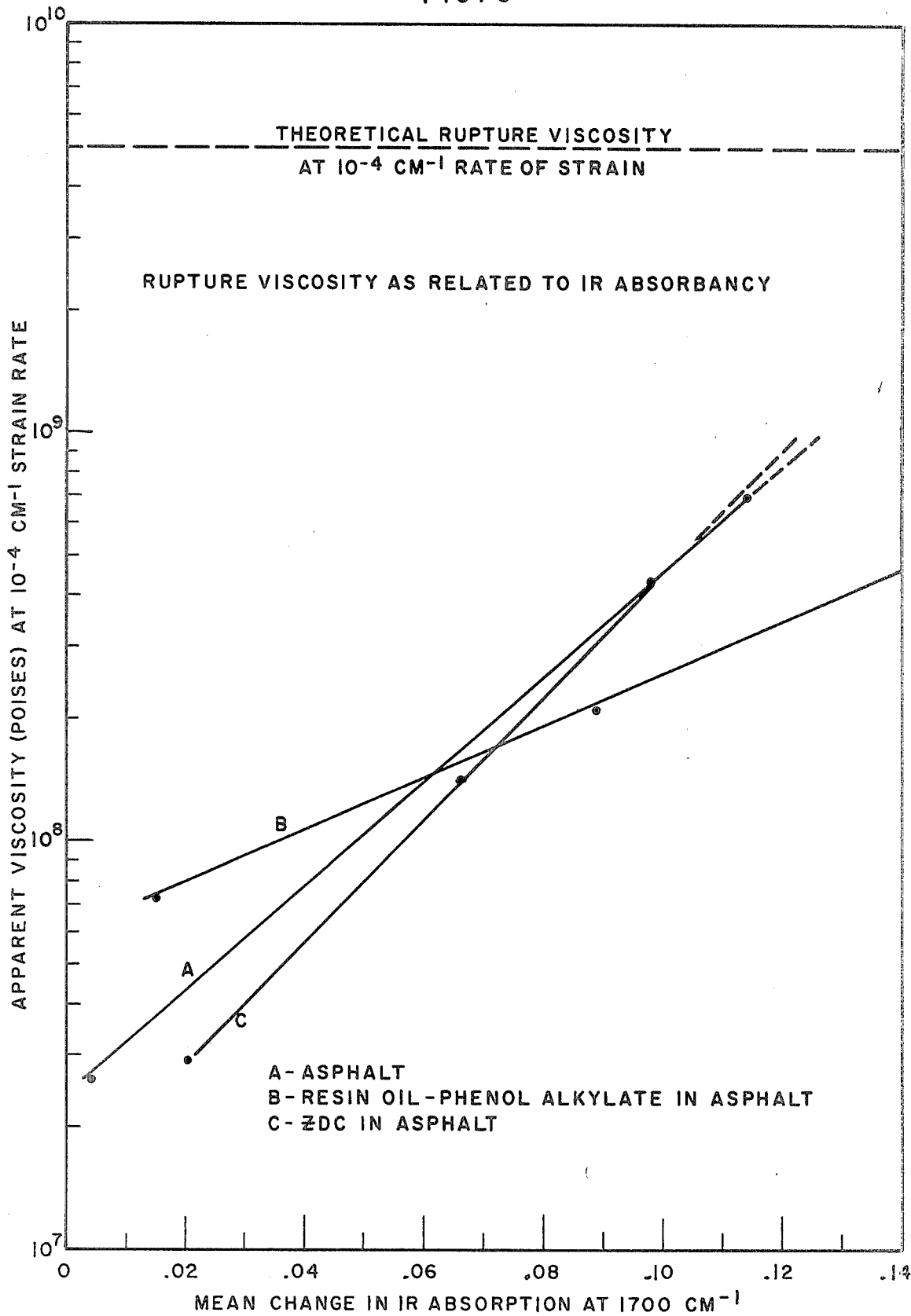

A series of thin asphalt films were prepared as described in previous examples from the same 85–100 penetration asphalt used therein. Some of the samples had incorporated in them 2% of zinc diethyldithiocarbamate (ZDC), others contained 2% resin oil alkylate and some serving as controls contained no additives. These films were aged for various periods in a weatherometer (Atlas Type DMC, 250-volts, 31 amps, 1-phase) as a means for accelerating the aging process due to solar radiation. Both microviscometer and infrared analyses were performed on the films after aging. Microviscometer changes as a function of time are recorded in FIG. 4 and IR absorbency change for each of the three samples is presented in FIG. 5. A plot of viscosity against mean IR absorbency change for these three samples is shown in FIG. 6 for predicting approach to a theoretical rupture viscosity at $10^{-4 \ -1}$ rate of strain. It will be seen that resin oil alkylate is a highly effective inhibitor against aging and is, in fact, superior to the generally recognized effective anti-oxidant, zinc diethyldithiocarbamate, in these tests.

EXAMPLE 6

Several tests were performed to test the anti-stripping properties of the resin-oil-phenol alkylate inhibitor of the invention and to test the influence of this added anti-oxidant on a commercially available anti-strip agent. Tests were conducted by coating a 2.54-cm fused quartz square with each of seven asphalt test samples and submerging it in distilled water. The samples were then stored at 65.5° C. and periodically examined for surface disbonding. In all cases, the asphalt was 85–100 penetration, propane-extracted, paving-grade asphalt, the same as that used in the other examples above. One sample was 100% asphalt to serve as control and the remaining ones contained individual additives at the two-weight-percent or combined additives at the four-weight-percent level. The commercially available anti-stripping agent, Pave 100 (Carlisle Chemical Co., a subsidiary of Cincinnati Milicron) represented a performance control for comparative purposes. Results are presented in Table 1 below. From these it will be seen that the resin oil-phenol alkylate added to asphalt extends water-stripping resistance slightly as compared to no additive. Further, this aging inhibitor in combination with the commercial anti-stripping agent gave better results than the latter alone in asphalt.

TABLE 1

| Degree of Disbonding of Asphalt and Additive in Quartz | | | | |
|---|---|---|---|---|
| Additive in Asphalt Wt. % | 1 day | 2 days | 5 days | 14 days |
| None | 15% | 25% | 70% | 80% |
| 2% RO* | minute | 3-4% | 20% | 50% |
| 2% Pave 100 | none | minute | 1-2% | 2-4% |
| 2% RO + 2% Pave 100 | none | none | none | none |

*Resin oil alkylate

What is claimed is:

1. A paving-grade asphalt composition having improved resistance to weathering comprising an asphalt having a penetration value in the range from 30 to 400 at 77° F. and having incorporated therein an amount sufficient to render said asphalt composition resistant to weathering of an additive consisting of the dialkylated product obtained by heating together phenol and resin oil, said resin oil comprising primarily $C_9$ aromatic compounds exhibiting olefinic unsaturation, at a temperature from about 70° to about 100° C. in contact with an acid catalyst employing a mole ratio of resin oil unsaturates to phenol of at least 2:1, neutralizing said reaction mixture, diluting with an organic solvent, separating the two-phases formed, flash-distilling the diluted organic phase at a pot temperature of about 350° C. at atmospheric pressure and recovering the dialkylated product as the pot residue.

2. The composition of claim 1 wherein said asphalt is a propane-extracted asphalt.

3. The composition of claim 1 wherein said asphalt has a penetration value of about 85 to 100 at 77° F.

4. The composition of claim 2 wherein the amount of said additive is in the range from about 0.25 to about 7.0% by weight of said asphalt.